(12) United States Patent
Seo et al.

(10) Patent No.: US 8,780,523 B2
(45) Date of Patent: Jul. 15, 2014

(54) MULTILAYER CERAMIC ELECTRONIC COMPONENT

(75) Inventors: Byung Kil Seo, Gyunggi-do (KR); Byung Sung Kang, Gyunggi-do (KR)

(73) Assignee: Samsung Electro-Mechanics Co., Ltd., Gyunggi-Do (KR)

(*) Notice: Subject to any disclaimer, the term of this patent is extended or adjusted under 35 U.S.C. 154(b) by 87 days.

(21) Appl. No.: 13/448,975

(22) Filed: Apr. 17, 2012

(65) Prior Publication Data

US 2013/0100576 A1 Apr. 25, 2013

(30) Foreign Application Priority Data

Oct. 19, 2011 (KR) .................. 10-2011-0107086

(51) Int. Cl.
*H01G 4/005* (2006.01)
*H01G 4/30* (2006.01)

(52) U.S. Cl.
USPC .............. 361/303; 361/321.2; 361/301.4

(58) Field of Classification Search
USPC .............. 361/301.4, 303, 311, 330, 321.2
See application file for complete search history.

(56) References Cited

U.S. PATENT DOCUMENTS 6,760,215 B2 * 7/2004 Devoe ...................... 361/303
7,859,821 B2 * 12/2010 Shimizu .................. 361/306.3

FOREIGN PATENT DOCUMENTS

| JP | 10-050546 A | 2/1998 |
| JP | 10-261546 | 9/1998 |
| KR | 10-2010-0077030 A | 7/2010 |

* cited by examiner

*Primary Examiner* — Jayprakash N Gandhi
*Assistant Examiner* — Dion Ferguson
(74) *Attorney, Agent, or Firm* — McDermott Will & Emery LLP (57) ABSTRACT

There is provided a high voltage and high capacitance multilayer ceramic electronic component having enhanced reliability, including: a ceramic body; a first layer including conductive patterns; and a second layer including a floating pattern, wherein the sum of the number of the first and second layers is 100 or more, the ceramic body has first and second external electrodes formed on outer surfaces thereof, and a ratio of a length of the floating pattern to a length of the ceramic body is 0.7 to 0.9, and a ratio of a length of the overlapped portion to the length of the floating pattern is 0.5 to 0.95, in a cross section taken in a length direction in which the first and second external electrodes are connected to and extended from the ceramic body and a stacking direction of the first and second layers.

25 Claims, 7 Drawing Sheets

MULTILAYER CERAMIC ELECTRONIC COMPONENT

CROSS-REFERENCE TO RELATED APPLICATIONS

This application claims the priority of Korean Patent Application No. 10-2011-0107086 filed on Oct. 19, 2011, in the Korean Intellectual Property Office, the disclosure of which is incorporated herein by reference.

BACKGROUND OF THE INVENTION

1. Field of the Invention

The present invention relates to a multilayer ceramic electronic component, and more particularly, to a high voltage and high capacitance multilayer ceramic electronic component.

2. Description of the Related Art

In accordance with the trend toward electronic products having a small size and high capacity, the demand for a multilayer ceramic capacitor having a small size and high capacitance has increased.

Therefore, thinning of a dielectric layer used in the multilayer ceramic capacitor has been demanded, and the number of multilayered internal electrodes has increased in order to realize high capacitance.

Due to the thinning of the dielectric layer and the increase in the number of multilayered internal electrodes, a defect in which dielectric breakdown voltage is lowered may occur.

Since the overall size of the capacitor is constant, when the number of multilayered internal electrodes is increased, a distance therebetween is reduced and the dielectric breakdown voltage is lowered, such that withstand voltage characteristics may be deteriorated. In addition, when a thickness of the dielectric layer is increased in order to increase withstand voltage, the number of internal electrodes is reduced, such that it may be difficult to realize high capacitance.

SUMMARY OF THE INVENTION

An aspect of the present invention provides a high voltage and high capacitance multilayer ceramic electronic component having enhanced reliability.

According to an aspect of the present invention, there is provided a multilayer ceramic electronic component including: a ceramic body; a first layer including conductive patterns spaced apart from each other by a gap; and a second layer disposed, with regard to the first layer, such that a ceramic layer is interposed therebetween, and including a floating pattern having at least one overlapped portion overlapped with the conductive patterns, wherein the sum of the number of the first and second layers is 100 or more, the ceramic body has first and second external electrodes formed on outer surfaces thereof, and a ratio of a length of the floating pattern to a length of the ceramic body is 0.7 to 0.9, and a ratio of a length of the overlapped portion to the length of the floating pattern is 0.5 to 0.95, in a cross section taken in a length direction in which the first and second external electrodes are connected to and extended from the ceramic body and a stacking direction of the first and second layers.

A ratio of an area of the floating pattern to an area of a region formed by the conductive patterns and the floating pattern may be 0.7 to 0.9, and a ratio of an area of the overlapped portion to the area of the floating pattern may be 0.5 to 0.95, when viewed in the stacking direction of the first and second layers.

The conductive patterns may include a first conductive pattern connected to the first external electrode and a second conductive pattern connected to the second external electrode.

The first layer may further include at least one first floating pattern disposed between the first and second conductive patterns, and the floating pattern may include a plurality of second floating patterns having portions overlapped with the first floating pattern. The length of the floating pattern may be the sum of lengths of the plurality of second floating patterns, and the length of the overlapped portion may be the sum of lengths of the overlapped portions of the second floating patterns overlapped with the conductive patterns.

A ratio of the sum of areas of the second floating patterns to an area of a region formed by the conductive patterns and the floating pattern may be 0.7 to 0.9, and a ratio of the sum of areas of the overlapped portions of the second floating patterns to the sum of the areas of the second floating patterns may be 0.5 to 0.95, when viewed in the stacking direction of the first and second layers.

The floating pattern may be overlapped with each of two adjacent conductive patterns spaced apart from each other by the gap of the first layer.

The conductive patterns and the floating pattern may have a rectangular shape, when viewed in the stacking direction of the first and second layers.

The conductive patterns may have the same width as that of the floating pattern.

The ceramic layer may have a thickness of 10 μm or greater.

The cross section may pass through a central portion of the ceramic body.

According to another aspect of the present invention, there is provided a multilayer ceramic electronic component including: a ceramic body; a first layer including conductive patterns spaced apart from each other by a gap; and a second layer disposed, with regard to the first layer, such that a ceramic layer is interposed therebetween, and including a floating pattern having an overlapped portion overlapped with the conductive patterns, wherein the sum of the number of the first and second layers is 100 or more, and a ratio of an area of the floating pattern to an area of a region formed by the conductive patterns and the floating pattern is 0.7 to 0.9, and a ratio of an area of the overlapped portion to the area of the floating pattern is 0.5 to 0.95, when viewed in a stacking direction of the first and second layers.

The conductive patterns may include a first conductive pattern connected to the first external electrode and a second conductive pattern connected to the second external electrode.

The first layer may further include at least one first floating pattern disposed between the first and second conductive patterns, and the floating pattern may include a plurality of second floating patterns having portions overlapped with the first floating pattern. The area of the floating pattern may be the sum of areas of the plurality of second floating patterns, and the area of the overlapped portion may be the sum of areas of the overlapped portions of the second floating patterns overlapped with the conductive patterns.

The floating pattern may be overlapped with each of two adjacent conductive patterns spaced apart from each other by the gap of the first layer.

The conductive patterns and the floating pattern may have a rectangular shape, when viewed in the stacking direction of the first and second layers.

The conductive patterns may have the same width as that of the floating pattern.

The ceramic layer may have a thickness of 10 μm or greater.

According to another aspect of the present invention, a multilayer ceramic electronic component including: a ceramic body; a first layer including first and second conductive patterns connected to first and second external electrodes, respectively, and a first floating pattern disposed between the first and second conductive patterns, while having gaps between the first floating pattern and the first and second conductive patterns; and a second layer disposed, with regard to the first layer, such that a ceramic layer is interposed therebetween, and including a plurality of second floating patterns having portions overlapped with at least one of the first and second conductive patterns and the first floating pattern, wherein the sum of the number of the first and second layers is 100 or more, the ceramic body has first and second external electrodes formed on outer surfaces thereof, and a ratio of the sum of lengths of the second floating patterns to a length of the ceramic body is 0.7 to 0.9, and a ratio of the sum of lengths of the overlapped portions to the sum of the lengths of the second floating patterns is 0.5 to 0.95, in a cross section taken in a length direction in which the first and second external electrodes are connected to and extended from the ceramic body and a stacking direction of the first and second layers.

A ratio of the sum of areas of the second floating patterns to an area of a region formed by the conductive patterns and the floating patterns may be 0.7 to 0.9, and a ratio of the sum of areas of the overlapped portions of the second floating patterns to the sum of the areas of the second floating patterns may be 0.5 to 0.95, when viewed in the stacking direction of the first and second layers.

The second floating patterns may be overlapped with each of two adjacent conductive patterns spaced apart from each other by the gaps of the first layer.

The number of the second floating patterns may be the same as that of the gaps.

The first and second conductive patterns and the first and second floating patterns may have a rectangular shape, when viewed in the stacking direction of the first and second layers.

The first and second conductive patterns and the first and second floating patterns may have the same width.

The cross section may pass through a central portion of the ceramic body.

The ceramic layer may have a thickness of 10 μm or greater.

BRIEF DESCRIPTION OF THE DRAWINGS

The above and other aspects, features and other advantages of the present invention will be more clearly understood from the following detailed description taken in conjunction with the accompanying drawings, in which:

FIGS. 4A through 5B are views showing modified examples of FIG. 3;

DETAILED DESCRIPTION OF THE PREFERRED EMBODIMENTS

Embodiments of the present invention will now be described in detail with reference to the accompanying drawings. The embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art. In the drawings, the shapes and dimensions of components may be exaggerated for clarity, and the same reference numerals will be used throughout to designate the same or like components.

Figure 1:
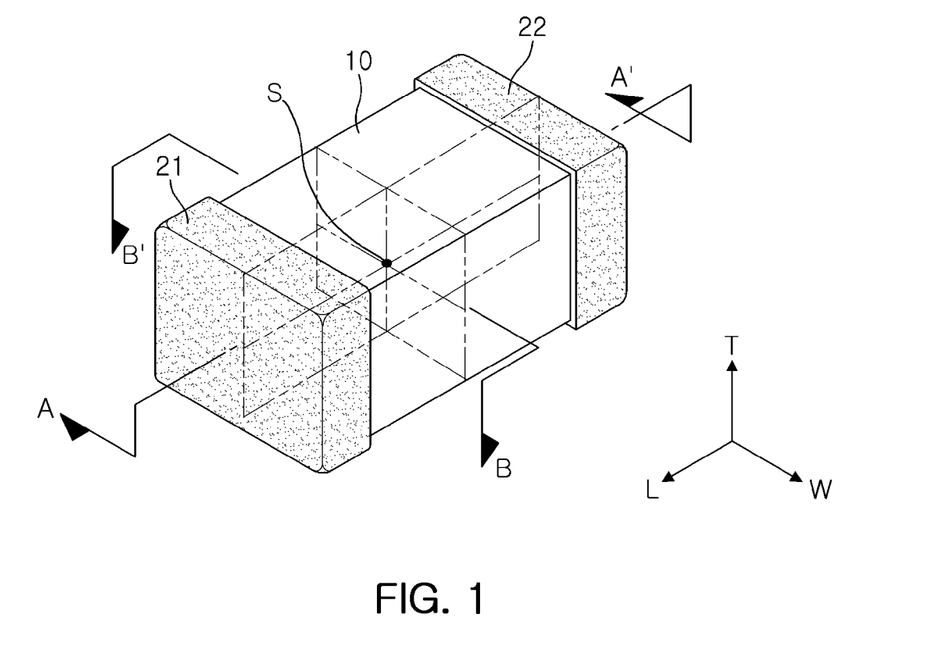
FIG. 1 is a perspective view of a multilayer ceramic electronic component according to an embodiment of the present invention.
Figure 2:
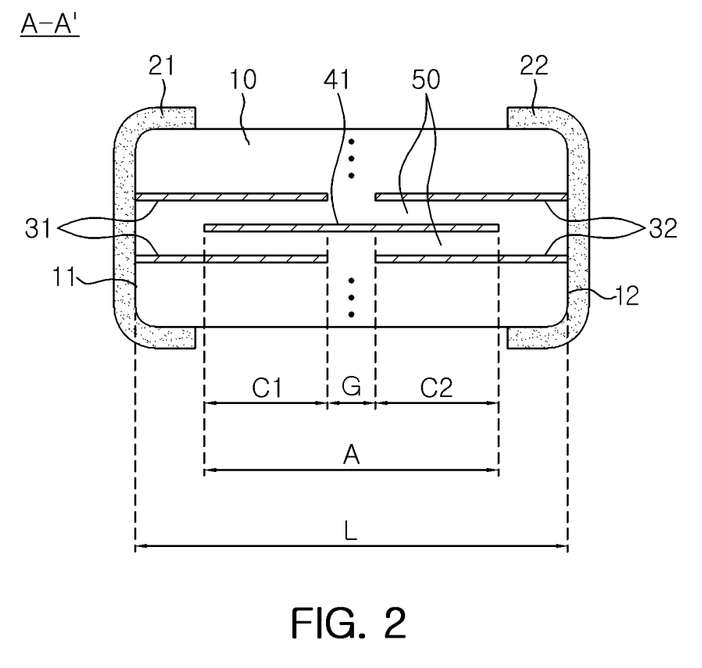
FIG. 2 is a cross-sectional view taken along line A-A' of FIG. 1 according to the embodiment of the present invention.

FIG. 1 is a perspective view of a multilayer ceramic electronic component according to an embodiment of the present invention. FIG. 2 is a cross-sectional view taken along line A-A' of FIG. 1 according to the embodiment of the present invention.

An example of a multilayer ceramic electronic component generally includes a capacitor, an inductor, a piezoelectric element, a varistor, a thermistor, or the like. Although a capacitor is described in the present embodiment as an example of the multilayer ceramic electronic component, the present invention is not limited thereto.

Referring to FIGS. 1 and 2, the multilayer ceramic capacitor according to the embodiment of the present invention may include a ceramic body 10, external electrodes 21 and 22 formed on an outer surface of the ceramic body 10, first layers 31 and 32 and a second layer 41 that are formed within the ceramic body 10.

In the embodiment of the present invention, a single floating pattern 41 may be formed in the second layer.

In the multilayer ceramic capacitor according to the present embodiment, a 'stacking direction' or a 'thickness direction' refers to a direction (a 'T direction') in which the first and second layers are stacked, a 'length direction' refers to a direction (an 'L direction') in which first and second external electrodes are connected to and extended from the ceramic body, and a 'width direction' refers to a direction (a 'W direction') perpendicular to the stacking direction and the length direction.

The ceramic body 10 may be formed by stacking a plurality of ceramic dielectric layers 50 and then sintering the same, wherein adjacent ceramic dielectric layers 50 may be integrated such that a boundary therebetween may not be readily apparent.

The ceramic dielectric layer 50 may be formed of a dielectric material and serves to increase capacitance of the capacitor. When an electric field is applied to the ceramic dielectric layer, electrical dipoles present in dielectric substance are arranged through reaction to the electric field, such that the dipole moment larger than a value of the electric field applied from the outside is induced.

A material having high permittivity is capable of inducing the electrical dipole moment, such that it may be useful for increasing the capacitance. Permittivity is a material constant having a value determined according to a material.

The ceramic body 10 may be formed of a ceramic material having high permittivity. For example, a barium titanate material, a strontium titanate material, or the like, may be used therefor, without being limited thereto.

The ceramic body 10 may be manufactured by the following method.

Additives such as a binder, or the like, are added to ceramic powders such as barium titanate, or the like, are ball-milled to produce ceramic slurry, in which the ceramic powders are uniformly dispersed. The ceramic slurry is applied to a carrier film through a doctor blade method, or the like, and then dried, thereby manufacturing a ceramic green sheet.

A thickness of the ceramic green sheet is appropriately adjusted in consideration of manufacturing process conditions such as an amount of the binder contained in the ceramic slurry, a sintering shrinkage rate of the ceramic powders, a pressing condition, and the like, whereby a thickness of the ceramic layer 50 of a sintered chip may be appropriately adjusted.

The ceramic layers 50 are stacked and are pressed at an appropriate pressure in a stacking direction, and the stacked body is sintered to thereby form the ceramic body.

The first and second external electrodes 21 and 22 may be formed on outer surfaces 11 and 12 of the ceramic body 10, respectively. The first and second external electrodes 21 and 22 may be individually applied with electricity having opposite polarities.

The external electrodes 21 and 22 may be formed of a paste containing a conductive metal powder including copper or the like as a main component and containing a glass component and other additives mixed with the conductive metal powder, be formed by a dipping method, and include a tin plating layer formed on a surface thereof in order to improve soldering characteristics, without being limited thereto.

The ceramic body 10 may have the first and second layers alternately stacked therein.

As shown in FIG. 2, the first layer may include conductive patterns 31 and 32 formed within the ceramic body 10, and the conductive patterns 31 and 32 may be spaced apart from each other by a gap G. That is, the conductive patterns 31 and 32 may be formed as two conductive regions. Two conductive patterns 31 and 32 may be formed on the same first layer.

Hereinafter, the two conductive regions formed on the first layer will be referred to as a 'first internal electrode' 31 and a 'second internal electrode' 32.

The first internal electrode 31 may be formed in the ceramic body 10 and be exposed to the outer surface 11 of the ceramic body 10 to thereby be connected to the first external electrode 21.

The second internal electrode 32 may be spaced apart from the first internal electrode 31 so as to be electrically separated from the first internal electrode 31.

In addition, the second internal electrode 32 may be exposed to the outer surface 12 of the ceramic body 10 to thereby be connected to the second external electrode 22.

Figure 3A:
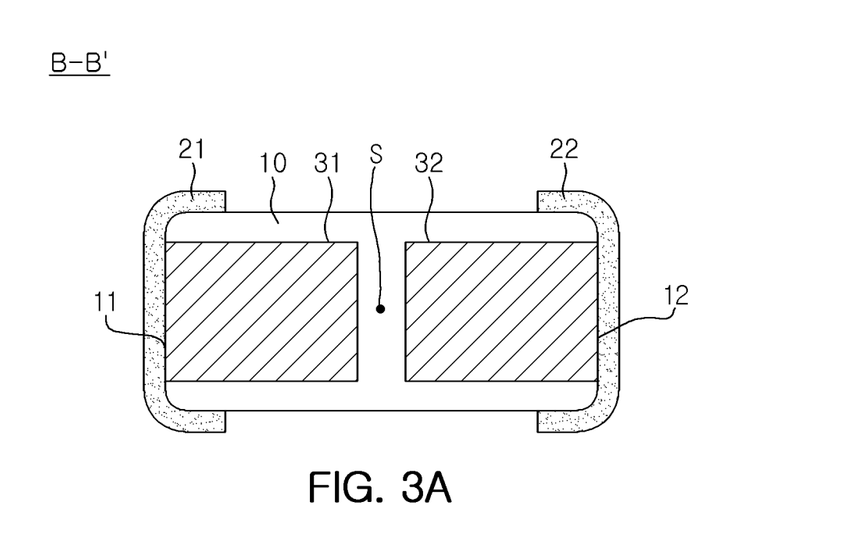
FIGS. 3A and 3B are plan views taken along line B-B' of FIG. 1 according to the embodiment of the present invention.

The first and second internal electrodes 21 and 22 may have a rectangular shape when being viewed in the stacking direction, but is not limited thereto.

The first and second internal electrodes may be applied with electricity having different polarities through the first and second external electrodes 21 and 22, respectively. That is, the first internal electrode 31 may be charged with positive (+) polarity and the second internal electrode 32 may be charged with negative (−) polarity, or vice versa.

The internal electrodes 31 and 32 may have a thickness of 0.7 μm or less, but is not limited thereto.

The internal electrodes 31 and 32 may be generally formed by printing a paste containing a conductive metal, a binder, and a solvent on a ceramic green sheet and then firing the paste.

As the conductive metal, nickel (Ni), a nickel alloy, or the like, may be used. The conductive paste for internal electrodes may further contain a ceramic material, for example, barium titanate. The barium titanate may raise a sintering initiation temperature of the internal electrode to suppress excessive grain growth. As the binder, a polymer resin such as polyvinyl butyral, ethylcellulose, or the like, may be used. The solvent is not particularly limited but may be, for example, terpineol, dihydroterpineol, butylcarbitol, kerosene, or the like.

Figure 3B:
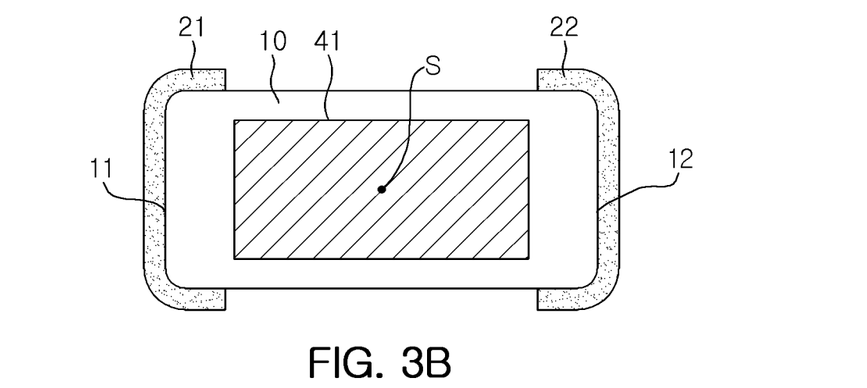
Figure 4A:
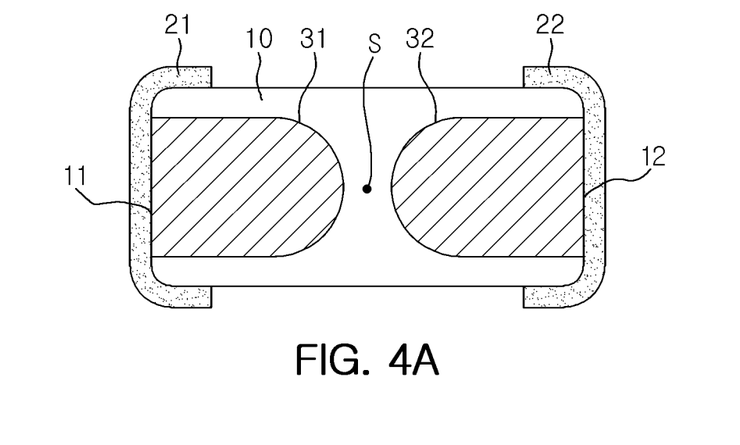
Figure 4B:
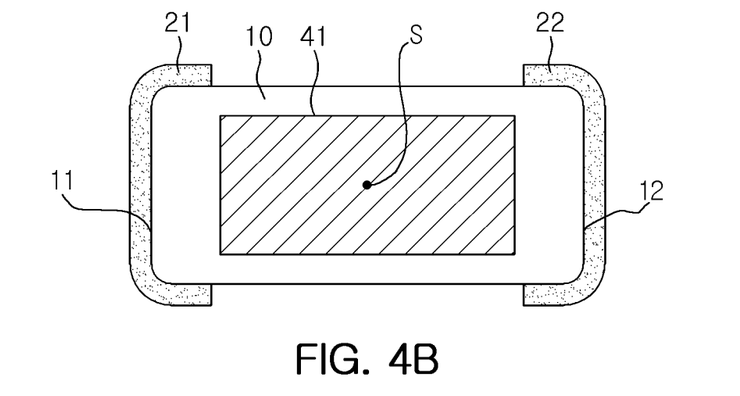
Figure 5A:
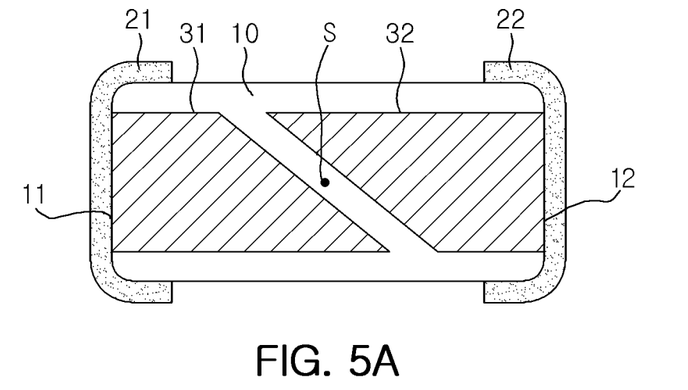
Figure 5B:
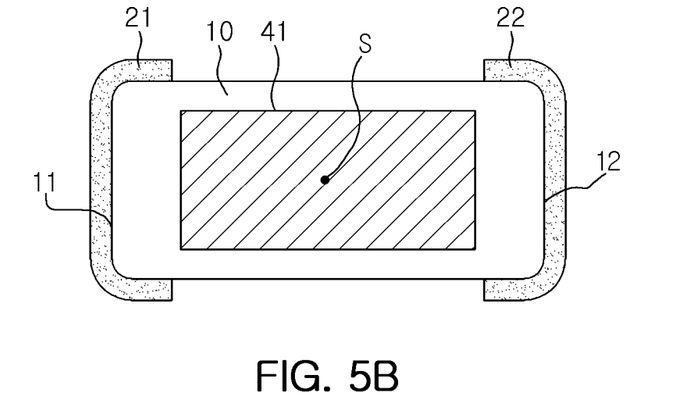

The second layer may include the floating pattern 41 and the ceramic layer 50 may be interposed between the floating pattern 41 and the first layers 31 and 32. The floating pattern 41 may have at least one or more overlapped portions C1 and C2 respectively overlapped with the conductive patterns 31 and 32 formed on the first layer.

Hereinafter, the floating pattern 41 will be referred to as a 'floating electrode' 41. The floating electrode 41 may be electrically separated from the first and second external electrodes.

The floating electrode 41 may have a rectangular shape when being viewed in the stacking direction. However, the rectangular shape may be slightly deformed while being subjected to a manufacturing process.

The floating electrode 41 may be formed within the ceramic body 10 so as not to be exposed to the outer surface of the ceramic body 10 and may be electrically separated from the first and second external electrodes 21 and 22.

The floating electrode 41 may have a width equal to those of the conductive patterns 31 and 32 formed on the first layer. The floating electrode 41 may have a width equal to those of the first and second internal electrodes 31 and 32.

Hereinafter, the reason why the floating electrode 41 is included will be described.

In a cross section taken in the thickness and length directions of the ceramic body, the multilayer ceramic capacitor may be functionally configured of an active layer in which the internal electrodes and the ceramic layers are alternately stacked and upper and lower cover layers formed by stacking only ceramic layers on upper and lower portions of the active layer.

Since the overall size of the ceramic capacitor is constant and thicknesses of the upper and lower cover layers are also constant, when the number of multilayered internal electrodes is increased in order to realize high capacitance, a distance between the internal electrodes (a thickness of the ceramic layer) is reduced, such that dielectric breakdown voltage may be lowered.

In addition, when the distance between the internal electrodes (the thickness of the ceramic layer) is increased in order to improve dielectric breakdown voltage characteristics, the number of multilayered internal electrodes is reduced, such that it may be difficult to realize high capacitance.

The above-mentioned problem may be significantly revealed in the case in which the number of multilayered internal electrodes is 100 or more. That is, in the case in which the number of multilayered internal electrodes is less than 100, since the thickness of the ceramic layer is large, the dielectric breakdown voltage may be high.

However, in the case in which the number of multilayered internal electrodes exceeds 100, since the thickness of the ceramic layer may not be sufficiently large, a reduction in dielectric breakdown voltage may occur.

In order to solve the above-mentioned problems, the floating electrode 41 has been included. That is, voltage acting on the internal electrodes 31 and 32 may be reduced by the floating electrode 41. Even in the case in which the ceramic layer 50 has the same dielectric breakdown voltage characteristics as the case according to the related art, the voltage acting on the ceramic layer 50 is reduced, such that the dielectric breakdown voltage is increased, that withstand voltage is increased, in view of the entire product.

In addition, the number of multilayered internal electrodes 31 and 32 may be increased within a range in which dielectric breakdown is not generated.

The ceramic layer 50 may be interposed between the floating electrode 41 and the first and second internal electrodes 31 and 32, and the floating electrode 41 may have first and second overlapped portions C1 and C2 respectively overlapped with the first and second internal electrodes 31 and 32 when being viewed in the stacking direction.

The floating pattern 41 and the first and second internal electrodes 31 and 32 may be alternately disposed, having the ceramic layer 50 interposed therebetween.

The floating pattern 41 may be formed on a portion of the second layer corresponding to the gap G so as to cover the gap G formed in the first layer.

When being view in the stacking direction, the floating pattern 41 may have the first overlapped portion C1 overlapped with the first internal electrode 31 and the second overlapped portion C2 overlapped with the second internal electrode 32 while simultaneously covering the gap G between the first and second internal electrodes 31 and 32.

The capacitance may be realized in the first and second overlapped portions C1 and C2 in which the floating pattern 41 and the first and second internal electrodes 32 are overlapped with each other.

It means that two capacitors are connected in series with each other in view of an equivalent circuit. The capacitors are disposed in series with each other as described above, whereby the voltage acting on the first and second internal electrodes 31 and 32 may be reduced by half.

In a cross section taken in the length direction in which the first and second external electrodes 21 and 22 are connected to and extended from the ceramic body and the stacking direction of the internal electrodes 31 and 32, a ratio (A/L) of a length A of the floating electrode 41 to a length L of the ceramic body 10 may be 0.7 to 0.9, and a ratio (C/A) of a length (C=C1+C2) of the overlapped portions C1 and C2 to the length A of the floating electrode 41 may be 0.5 and 0.95.

In the case in which a plurality of floating electrodes 41 are provided, the length A of the floating electrode 41 may be the sum of lengths of the plurality of floating electrodes 41. Further, in the case in which a plurality of overlapped portions are provided, the length C of the overlapped portions may be the sum of the length C1 of the first overlapped portion and the length C2 of the second overlapped portion.

When A/L is less than 0.7, the lengths of the first and second overlapped portions C1 and C2 contributing to forming the capacitance are short, so it may be difficult to realize high capacitance. When A/L exceeds 0.9, a distance between the first and second external electrodes 21 and 22 and the floating electrode 41 may be excessively short, such that a flashover may be generated between the first or second external electrode 21 or 22 and the floating electrode 41.

When C/A is less than 0.5, the lengths of the first and second overlapped portions C1 and C2 contributing to forming the capacitance are short, such that the capacitance of a product may be reduced. When C/A exceeds 0.95, the gap between the first and second internal electrodes 31 and 32 may be excessively narrow, such that it may be difficult to completely fill the gap G between the first and second internal electrodes 31 and 32 with ceramic and air may remain in the gap G. In this case, since the air has a lower dielectric breakdown voltage than the ceramic, the dielectric breakdown voltage between the first and second internal electrodes 31 and 32 may be reduced and a short-circuit or flashover may be generated.

The floating electrode 41 may have a rectangular shape when being viewed in the stacking direction, but is not limited thereto.

Although FIG. 1 shows a case in which a cross section taken in the length and thickness directions of the ceramic body passes through the center S of the ceramic body, the present invention is not limited thereto. That is, the cross section may pass through a section within a distance equal to 15% of an overall width of the ceramic body 10 on either side of the center S of the ceramic body 10. Here, the section within a distance equal to 15% of the overall width of the ceramic body 15 on either side of the center S of the ceramic body 10 is defined as a central portion of the ceramic body 10.

When the cross section passes through the central portion, a ratio of lengths between the internal electrodes 31 and 32 and the floating electrode 41 may be stable.

Although FIGS. 4A through 5B show a case in which the first and second internal electrodes 31 and 32 do not have a rectangular shape, the present invention is not limited thereto but may be variously modified. The length A of the floating electrode 41 may be changed according to whether the cross section passes through the center S of the ceramic body 10 or a point of the ceramic body 10 other than the center S thereof.

The floating electrode 41 may be formed of the same material as those of the first and second electrodes 31 and 32. That is, the floating electrode 41 as well as the first and second electrodes 31 and 32 may be formed of a paste for internal electrodes.

The first and second internal electrodes 31 and 32 and the floating electrode 41 are formed of the same material, such that a process of separately preparing a paste for a floating electrode is omitted, whereby processing time and costs may be reduced.

Meanwhile, charges are accumulated in the first and second overlapped portions C1 and C2 in which the first and second internal electrodes 31 and 32 and the floating electrode 41 are overlapped with each other. As described above, since the internal electrodes 31 and 32 and the floating electrode 41 are formed of the same material, the internal electrodes 31 and 32 and the floating electrode 41 have the same electrical characteristics, such that electrical characteristics of the multilayer ceramic capacitor may be more stable.

The sum of the number of first layers and the number of second layers may be 100 or more.

A problem generated in realizing the high capacitance and high voltage multilayer ceramic capacitor according to the related art may be significantly revealed in the case in which the number of multilayered internal electrodes is 100 or more. That is, in the case in which the number of multilayered internal electrodes is less than 100, since the thickness of the ceramic layer is large, it is not problematic in realizing the high voltage multilayer ceramic capacitor. However, in the case in which the number of multilayered internal electrodes exceeds 100, since the thickness of the ceramic layer may not be sufficiently large, the dielectric breakdown voltage characteristics of the ceramic layer may be deteriorated. In order to simultaneously solve these two problems, the floating electrode is included, as described above.

The multilayer ceramic capacitor according to the present embodiment, having a structure in which the internal electrodes 31 and 32 and the floating electrode 41 are alternately stacked, is different from the related art capacitor having a structure in which only the internal electrodes are stacked.

The ceramic layer 50 may have a thickness of 10 μm or more.

When the sum of the number of multilayered internal electrodes 31 and 32 and the number of multilayered floating electrodes 41 is 100 or more, the thickness of the ceramic layer 50 between the internal electrodes 31 and 32 and the floating electrode 41 is inevitably reduced. Nevertheless, the ceramic layer 50 needs to have a thickness of 10 μm.

The reason is that when the thickness of the ceramic layer 50 is 10 μm or less, a distance between the internal electrodes 31 and 32 and the floating electrode 41 may be excessively short, such that withstand voltage characteristics may be deteriorated.

The thickness of the ceramic layer 50 means an average thickness of the distances between the first and second internal electrodes 31 and 32 and the floating electrode 41, which may be measured as follows.

With respect to the cross section taken in the length direction and the stacking direction of the ceramic body 10, the overlapped portions, in which the first and second internal electrodes 31 and 32 and the floating electrode 41 are overlapped with each other, are photographed using a scanning electron microscope (SEM) having 10,000 magnifications. Shortest distances between the first and second internal electrodes 31 and 32 and the floating electrode 41 at thirty points having the same interval on the scanning electron microscope image are measured, such that an average value thereof is calculated. An average value obtained by repeatedly performing the above-mentioned measurement with respect to ten or more ceramic layers 50 may be the thickness of the ceramic layer 50.

When being viewed in the stacking direction, the first and second internal electrodes 31 and 32 and the floating electrode 41 may have a rectangular shape and have the same width.

In this case, since the first and second internal electrodes 31 and 32 and the floating electrode 41 have the same width, a ratio of areas between the first and second internal electrodes 31 and 32 and the floating electrode 41 may be the same as a ratio of lengths therebetween. However, the present invention is not limited to the case in which the first and second internal electrodes 31 and 32 and the floating electrode 41 have the same width. That is, the case in which the first and second internal electrodes 31 and 32 and the floating electrode 41 have the same width is only an example of the present invention.

When being viewed in the stacking direction of the first and second layers, a ratio (Q/P) of an area (Q) of the floating electrode 41 to an area (P) of a region formed by the first and second internal electrodes 31 and 32 and the floating electrode 41 may be 0.7 to 0.9, and a ratio (R/Q) of an area (R) of the overlapped portions C1 and C2 to the area (Q) of the floating electrode 41 may be 0.5 to 0.95.

When being viewed in thestacking direction of the first and second layers, the area (P) of the region formed by the first and second internal electrodes 31 and 32 and the floating electrode 41 is obtained by subtracting the areas of the first and second overlapped portions C1 and C2 in which the first and second internal electrodes 31 and 32 and the floating electrode 41 are overlapped with each other from the sum of the areas of the first and second internal electrodes 31 and 32 and the area of the floating electrode 41.

In the case in which the plurality of floating electrodes 41 are provided, the area Q of the floating electrode 41 may be the sum of areas of the plurality of floating electrodes 41.

Further, in the case in which the plurality of overlapped portions are provided, the area (R) of the overlapped portion may be the sum of areas of the overlapped portions C1 and C2.

When Q/P is less than 0.7, the lengths of the first and second overlapped portions C1 and C2 are short, so it may be difficult to realize high capacitance. When Q/P exceeds 0.9, a distance between the first and second external electrodes 21 and 22 and the floating electrode 41 may be excessively short, such that a flashover may be generated between the first and second external electrodes 21 and 22 and the floating electrode 41.

When R/Q is less than 0.5, the areas of the first and second overlapped portions C1 and C2 contributing to forming the capacitance are reduced, such that the capacitance may be reduced. When R/Q exceeds 0.95, the gap between the first and second internal electrodes 31 and 32 may be excessively narrow, such that it may be difficult to completely fill the gap G between the first and second internal electrodes 31 and 32 with ceramic and air may remain in the gap G. In this case, since the air has a lower dielectric breakdown voltage than the ceramic, the dielectric breakdown voltage between the first and second internal electrodes 31 and 32 may be reduced and a short-circuit or flashover may be generated.

Hereinafter, another embodiment of the present invention will be described with reference to FIGS. 2 through 3B.

A ceramic electronic capacitor according to the present embodiment may include a ceramic body 10; a first layer including conductive patterns 31 and 32 spaced apart from each other by a gap G; and a second layer disposed, with regard to the first layer, such that a ceramic layer 50 is interposed therebetween, and including a floating pattern 41 having overlapped portions C1 and C2 respectively overlapped with the conductive patterns 31 and 22, wherein the sum of the number of first layers and the number of second layers is 100 or more, and a ratio (Q/P) of an area (Q) of the floating pattern 41 to an area (P) of a region formed by the conductive patterns 31 and 32 and the floating pattern 41 is 0.7 to 0.9, and a ratio (R/Q) of an area (R) of the overlapped portions C1 and C2 to the area (Q) of the floating pattern 41 is 0.5 to 0.95, when being viewed in a stacking direction of the first and second layers.

In the present embodiment, a case in which a single floating pattern 41 is formed on the second layer will be described by way of example.

The conductive patterns 31 and 32 may include a first conductive pattern 31 connected to a first external electrode 21 and a second conductive pattern 32 connected to a second external electrode 22, and the floating pattern 41 may be formed on a position of the second layer corresponding to the gap G so as to cover the gap G.

Hereinafter, the first conductive pattern will be referred to as a 'first internal electrode' 31, the second conductive pattern will be referred to as a 'second internal electrode' 32, and the floating pattern will be referred to as a 'floating electrode' 41.

When being viewed in the stacking direction of the first and second layers, the first and second internal electrodes 31 and 32 and the floating electrode 41 may have a rectangular shape, and the first and second internal electrodes may have the same width as that of the floating electrode 41.

In addition, the ceramic layer may have a thickness of 10 μm or more, and the cross section may pass through the central portion of the ceramic body.

Other details for the ceramic body, the internal electrodes, the external electrodes, and the like, are the same as those of the above-mentioned embodiment.

However, when being viewed in the stacking direction of the first and second layers, a ratio (Q/P) of an area (Q) of the floating electrode 41 to an area (P) of a region formed by the first and second internal electrodes 31 and 32 and the floating electrode 41 may be 0.7 to 0.9, and a ratio (R/Q) of an area (R) of the overlapped portions C1 and C2 to the area (Q) of the floating electrode 41 may be 0.5 to 0.95.

When Q/P is less than 0.7, the lengths C1 and C2 of the first and second overlapped portions are short, so it may be difficult to realize high capacitance. When Q/P exceeds 0.9, a distance between the first and second external electrodes 21 and 22 and the floating electrode 41 may be excessively short, such that a flashover may be generated between the first and second external electrodes 21 and 22 and the floating electrode 41.

When R/Q is less than 0.5, the areas of the first and second overlapped portions C1 and C2 contributing to forming the capacitance are reduced, such that the capacitance may be reduced. When R/Q exceeds 0.95, the gap between the first and second internal electrodes 31 and 32 may be excessively narrow, such that it may be difficult to completely fill the gap G between the first and second internal electrodes 31 and 32 with ceramic and air may remain in the gap G. In this case, since the air has a lower dielectric breakdown voltage than the ceramic, the dielectric breakdown voltage between the first and second internal electrodes 31 and 32 may be reduced and a short-circuit or flashover may be generated.

Hereinafter, another embodiment of the present invention will be described with reference to FIGS. 6 through 7B.

Figure 6:
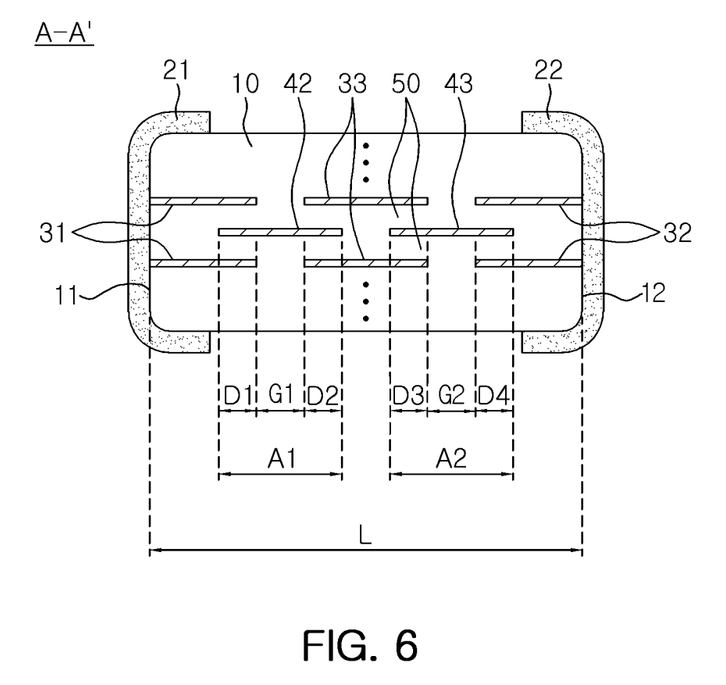
FIG. 6 is a cross-sectional view of a multilayer ceramic electronic component according to another embodiment of the present invention, taken along line A-A' of FIG. 1.
Figure 7A:
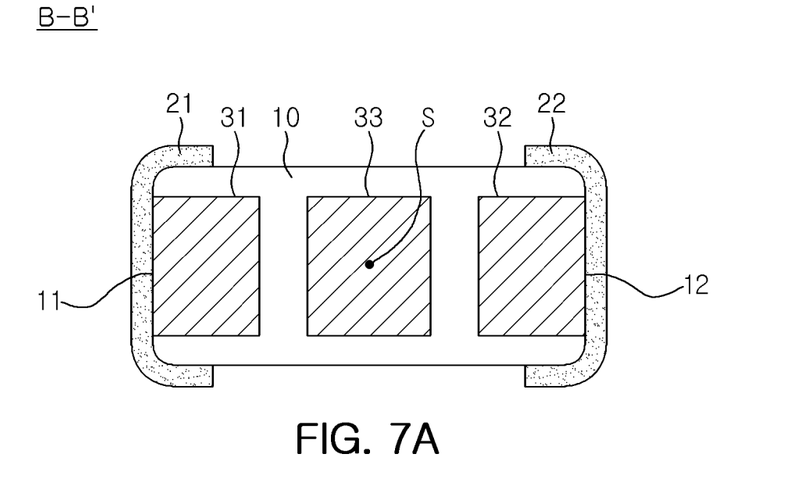
FIGS. 7A and 7B are plan views of a multilayer ceramic electronic component according to another embodiment of the present invention, taken along line B-B' of FIG. 1.
Figure 7B:
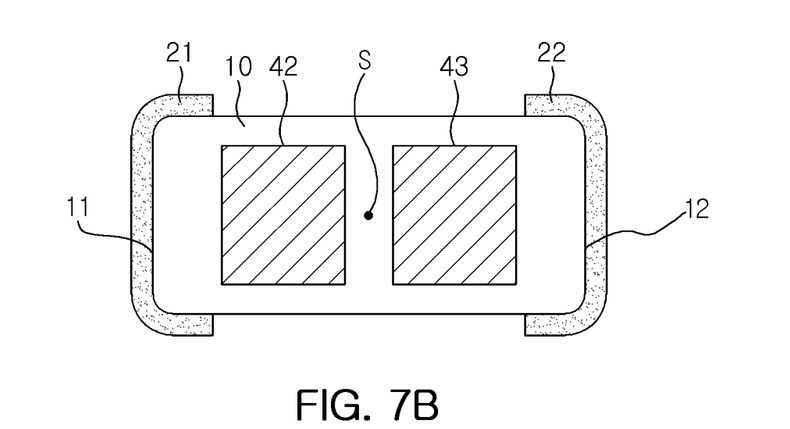

FIG. 6 is a cross-sectional view of a multilayer ceramic electronic component according to another embodiment of the present invention, taken along line A-A' of FIG. 1; and FIGS. 7A and 7B are cross-sectional views of a multilayer ceramic electronic component according to another embodiment of the present invention, taken along line B-B' of FIG. 1. FIG. 7A shows a first layer, and FIG. 7B shows a second layer.

In the present embodiment, at least two floating patterns are formed on the second layer. That is, a multilayer ceramic capacitor according to the present embodiment may include a ceramic body 10; a first layer including first and second conductive patterns 31 and 32 and a first floating pattern 33 disposed between the first and second conductive patterns 31 and 32; and a second layer disposed, with regard to the first layer, such that a ceramic layer 50 is interposed therebetween, and including second floating patterns 42 and 43 having overlapped portions D1 to D4 overlapped with the first and second conductive patterns 31 and 32 and the first floating pattern 33, wherein the sum of the number of first layers and the number of second layers is 100 or more, the ceramic body 10 has first and second external electrodes 21 and 22 formed on outer surfaces 11 and 12 thereof, and a ratio of a length A1+A2 of the second floating patterns 42 and 43 to a length L of the ceramic body 10 is 0.7 to 0.9 and a ratio of a length D1+D2+D3+D4 of the overlapped portions to the length A1+A2 of the second floating patterns 42 and 43 is 0.5 to 0.95, in a cross section taken in a length direction (an "L direction") in which the first and second external electrodes 21 and 22 are connected to the ceramic body 10 and a stacking direction (a "T direction") in which the first and second layers are stacked.

Although the present embodiment provided with reference to FIGS. 6 and 7 describes a case in which the number of floating patterns formed on the second layer, that is, second floating patterns is two by way of example, the present invention is not limited thereto but may also be applied to a case in which three or more second floating electrodes are formed on the second layer.

The first layer may include the first and second conductive patterns 31 and 32 and the floating pattern 33 disposed between the first and second conductive patterns.

Hereinafter, the first conductive pattern will be referred to as a 'first internal electrode' 31, the second conductive pattern will be referred to as a 'second internal electrode' 32, and the floating pattern formed on the first layer will be referred to as a 'first floating electrode' 33.

The first internal electrode 31 may be connected to the first external electrode 21, and the second internal electrode 32 may be connected to the second external electrode 22.

The first floating electrode 33 and the first and second internal electrodes 31 and 32 may be spaced apart from each other by gaps G1 and G2 therebetween.

The second layer may be disposed, with regard to the first layer, such that the ceramic layer 50 is interposed therebetween, and may include the floating electrodes 42 and 43 having the overlapped portions D1 to D4 overlapped with the first and second internal electrodes 31 and 32 and the first floating pattern 33.

Hereinafter, the floating patterns formed on the second layer will be referred to as 'second floating electrodes' 42 and 43.

The number of second floating electrodes 42 and 43 formed on the second layer may be two or more. However, the present embodiment describes a case in which the number of second floating electrodes is two by way of example.

The second floating electrodes 42 and 43 may be formed on portions of the second layer corresponding to the gaps G1 and G2 to thereby cover the gaps G1 and G2.

Since the second floating electrodes 42 and 43 are formed at the positions corresponding to the gaps G1 and G2, the number of second floating electrodes 42 and 43 may be the same as that of gaps G1 and G2.

Since the first layer includes the first gap G1 positioned between the first internal electrode 31 and the first floating electrode 33 and the second gap G2 positioned between the first floating electrode 33 and the second internal electrode 32, one second floating electrode 42 may be formed at a position corresponding to the first gap G1 and the other second floating electrode 43 may be formed at a position corresponding to the second gap G2.

That is, one second floating electrode 42 may cover the gap G1 between the first internal electrode 31 and the first floating electrode 33 and have first and second overlapped portions D1 and D2 respectively overlapped with a portion of the first internal electrode 31 and a portion of the first floating electrode 33, when being viewed in the stacking direction of the internal electrodes.

The other second floating electrode 43 may cover the gap G2 between the first floating electrode 33 and the second internal electrode 32 and have third and fourth overlapped portions D3 and D4 respectively overlapped with a portion of the first floating electrode 33 and a portion of the second internal electrode 32, when being viewed in the stacking direction of the internal electrodes.

Capacitance may be formed in the first to fourth overlapped portions D1 to D4.

The second floating electrodes 42 and 43 may be disposed on the second layer while being spaced apart from each other.

The second floating electrodes 42 and 43 may be electrically separated from the first and second external electrodes 21 and 22.

When being viewed in the stacking direction of the first and second layers, the first and second internal electrodes 31 and 32 and the first and second floating electrodes 33, 42, and 43 may have a rectangular shape.

However, the first and second internal electrodes 31 and 32 and the first and second floating electrodes 33, 42, and 43 may also be deformed during a manufacturing process such as compression, or the like.

The first and second internal electrodes 31 and 32 and the first and second floating electrodes 33, 42, and 43 may have the same width.

The ceramic body 10 may have the first and second external electrodes 21 and 22 formed on outer surfaces 11 and 12 thereof, and the ratio (A/L) of the length A of the second floating patterns 42 and 43 to the length L of the ceramic body 10 may be 0.7 to 0.9 and the ratio (D/A) of the length D of the overlapped portions to the length A of the second floating patterns 42 and 43 may be 0.5 to 0.95, in the cross section taken in the length direction (the "L direction") in which the first and second external electrodes 21 and 22 are connected to the ceramic body 10 and the stacking direction (the "T direction") in which the first and second layers are stacked.

Here, the length A of the second floating electrodes may be the sum of a length A1 of one second floating electrode 42 and a length A2 of the other second floating electrode 43, and the length D of the overlapped portion may be the sum D1+D2+D3+D4 of the first to fourth overlapped portions.

When A/L is less than 0.7, since the length of the second floating electrodes is short, such that the length D of the first to fourth overlapped portions D1 to D4 may be short, and it may be difficult to realize high capacitance. When A/L exceeds 0.9, distances between the first and second external electrodes 21 and 22 and the second floating electrodes 42 and 43 may be excessively short, such that a flashover may be generated between the first and second external electrodes 21 and 22 and the floating electrodes 42 and 43.

When D/A is less than 0.5, the first to fourth overlapped portions D1 to D4 contributing to forming the capacitance are reduced, such that the capacitance may be reduced. When D/A exceeds 0.95, the gaps between the first and second internal electrodes 31 and 32 and the first floating electrode 33 are excessively narrow, such that it is difficult to completely fill the gaps between the first and second internal electrodes 31 and 32 and the floating electrode 33 with ceramic and air may remain in the gaps. Therefore, dielectric breakdown voltage between the first and second internal electrodes 31 and 32 may be reduced and a short-circuit or flashover may be generated.

Although FIG. 1 shows a case in which a cross section taken in the length and thickness directions of the ceramic body passes through the center S of the ceramic body, the present invention is not limited thereto. That is, the cross section may pass through a section within a distance equal to 15% of an overall width of the ceramic body 10 on either side of the center S of the ceramic body 10. Here, the section within a distance equal to 15% of the overall width of the ceramic body 15 on either side of the center S of the ceramic body 10 is defined as a central portion of the ceramic body 10.

When the cross section passes through the center S of the ceramic body or the central portion thereof, a ratio of lengths between the internal electrodes 31 and 32 and the floating electrodes 33, 42 and 43 may be stable.

Although FIGS. 4A through 5B show a case in which the first and second internal electrodes 31 and 32 do not have a rectangular shape, the present invention is not limited thereto but may be variously modified. The length A of the floating electrodes may be changed according to whether the cross section passes through the center S of the ceramic body or a point of the ceramic body other than the center S thereof.

In the present embodiment, when being viewed in the stacking direction of the first and second layers, a ratio (Q/P) of an area (Q) of the second floating electrode 42 and 43 to an area (P) of a region formed by the first and second internal electrodes 31 and 32 and the first and second floating electrodes 33, 42, and 43 may be 0.7 to 0.9, and a ratio (R/Q) of an area (R) of the overlapped portions D1+D2+D3+D4 to the area (Q) of the second floating electrodes 42 and 43 may be 0.5 to 0.95.

The area (P) of the region formed by the first and second internal electrodes 31 and 32 and the first and second floating electrodes 33, 42, and 43 is obtained by subtracting the areas of the first to fourth overlapped portions D1+D2+D3+D4 from the sum of the areas of the first and second internal electrodes 31 and 32 and the areas of the floating electrodes 33, 42, and 43.

When Q/P is less than 0.7, the first to fourth overlapped portions D1 to D4 are reduced, it may be difficult to realize high capacitance. When Q/P exceeds 0.9, distances between the first and second external electrodes 21 and 22 and the floating electrodes 42 and 43 may be excessively short, such that a flashover may be generated between the first and second external electrodes 21 and 22 and the floating electrodes 42 and 43.

When R/Q is less than 0.5, the areas of the first to fourth overlapped portions D1 to D4 contributing to forming the capacitance are reduced, such that the capacitance may be reduced. When R/Q exceeds 0.95, the gap between the first and second internal electrodes 31 and 32 may be excessively narrow, such that it may be difficult to completely fill the gap G between the first and second internal electrodes 31 and 32 with ceramic and air may remain in the gap G. In this case, since the air has a lower dielectric breakdown voltage than the ceramic, the dielectric breakdown voltage between the first and second internal electrodes 31 and 32 may be reduced and a short-circuit or flashover may be generated.

When being viewed in the stacking direction of the first and second layers, the first and second internal electrodes 31 and 32 and the first and second floating electrodes 33, 42, and 43 may have a rectangular shape.

The sum of the number of first layers and the number of second layers may be 100 or more, and the ceramic layer 50 may have a thickness of 10 μm.

Other details for the ceramic body 10, the internal electrodes 31 and 32, the external electrodes 21 and 22, the thickness of the ceramic layer 50, and the like, are the same as those of the above-mentioned embodiment.

Inventive Example

Hereinafter, the present invention will be described in more detail with reference to Inventive Examples and Comparative Examples. These Examples are to help the understanding of the present invention, and the scope of the present invention is not limited thereto.

A multilayer ceramic capacitor having a single floating electrode 41 formed on a second layer was manufactured using the following method (See FIGS. 2 and 3).

First, a barium titanate ceramic powder was mixed with additives such as ethanol, binder, and the like, and then ball-milled to prepare a ceramic slurry in which the ceramic powder was uniformly dispersed. Then, the ceramic slurry was applied to a carrier film using a doctor blade method and then dried to thereby produce a dielectric green sheet. Here, the dielectric green sheet was formed to have a thickness of 20 μm after sintering.

Additives such as a solvent, a binder, and the like, were added to a nickel powder having an average particle size of 0.05 to 0.2 μm and the mixture thereof was ball-milled to produce a paste for internal electrodes, in which a conductive metal, nickel was uniformly dispersed.

First and second internal electrodes 31 and 32 were printed on the dielectric green sheet and a floating electrode 41 was printed on a separate green sheet, using the paste for internal electrodes by a screen printing method.

The first and second internal electrodes 31 and 32 and the floating electrode 41 were printed to have a rectangular shape and have the same width.

A dielectric green sheet on which the first and second internal electrodes 31 and 32 and the floating electrode 41 were not formed was initially disposed, a dielectric green sheet (a first layer) on which the first and second internal electrodes 31 and 32 were formed was stacked thereon, a dielectric green sheet (a second layer) on which the floating electrode 41 was formed was stacked thereon, and a dielectric green sheet, on which the first and second internal electrodes 31 and 32 and the floating electrode 41 were not formed, was then stacked to thereby prepare a stacked body.

The above-mentioned process was repeated to allow the sum of the number of first layers and the number of second layers to be 100.

The stacked body was isostatically pressed at a pressure of 1,000 kgf/cm$^2$ at a temperature of 85° C.

The pressed body was cut to manufacture a green chip. Then, the green chip was subjected to a de-binder process in which it was maintained at a temperature of 230° C. for 60 hours under an air atmosphere and was then fired at a temperature of 1200° C. under a reduction atmosphere ($10^{-11}$ atm to $10^{-10}$ atm, lower than an oxygen partial pressure in a state in which Ni/NiO are balanced) to manufacture a fired chip. A distance between the first and second internal electrodes and the floating electrode, that is, a thickness of a dielectric ceramic layer 50 was 20 μm on average.

After an outer surface of the fired chip was polished, the fired chip was dipped in a conductive paste for external electrodes and then baked to form first and second external electrodes 21 and 22. The conductive paste for external electrodes was prepared by adding glass frit, a binder, and the like, to a copper powder.

A nickel plating layer and a tin plating layer were formed on surfaces of the first and second external electrodes 21 and 22 through electroplating.

A length L of the ceramic body was fixed to 4,210 μm, and a length A of the floating electrode 41 and the sum (C=C1+C2) of lengths of first and second overlapped portions in which the floating electrode 41 and the first and second internal electrodes 31 and 32 are overlapped with each other were changed as shown in Table 1.

With respect to the multilayer ceramic capacitor prepared by the above-mentioned method, withstand voltage characteristics and the possible presence of internal defects were inspected.

The withstand voltage characteristics are associated with an amount of voltage that a product may withstand. Voltage in the moment at which dielectric breakdown is generated while voltage rose at a speed of 10V/sec was measured to be used as a withstand voltage value.

Table 1 shows withstand voltage values and the possible presence of internal defects according to variations in the length A of the floating electrode 41 and the sum (C=C1+C2) of the lengths of the first and second overlapped portions in which the floating electrode 41 and the first and second internal electrodes 31 and 32 are overlapped with each other.

In addition, Table 1 shows withstand voltage values and the possible presence internal defects according to a ratio (Q/P) of an area (Q) of the floating electrode 41 to an area (P) of a region formed by the first and second internal electrodes 31 and 32 and the floating electrode 41 and a ratio (R/Q) of an area (R) of the first and second overlapped portions C1 and C2 to the area (Q) of the floating electrode 41 when being viewed in a stacking direction.

TABLE 1

| Division | L (μm) | C (μm) | A (μm) | A/L | C/A | Q/P | R/Q | Defect Type | Defect Rate(%) | Withstand Voltage (kv) |
|---|---|---|---|---|---|---|---|---|---|---|
| *Comparative Example 1 | 4210 | 2500 | 2800 | 0.67 | 0.89 | 0.67 | 0.89 | Alignment Defect | 68 | 2.10 |
| *Comparative Example 2 | 4210 | 2600 | 2900 | 0.69 | 0.90 | 0.69 | 0.90 | Alignment Defect | 34 | 3.14 |
| Inventive Example 1 | 4210 | 2700 | 3000 | 0.71 | 0.90 | 0.71 | 0.90 | No | 0 | 4.68 |
| Inventive Example 2 | 4210 | 2800 | 3100 | 0.74 | 0.90 | 0.74 | 0.90 | No | 0 | 4.67 |
| Inventive Example 3 | 4210 | 2900 | 3200 | 0.76 | 0.91 | 0.76 | 0.91 | No | 0 | 4.68 |
| Inventive Example 4 | 4210 | 3000 | 3300 | 0.78 | 0.91 | 0.78 | 0.91 | No | 0 | 4.67 |
| Inventive Example 5 | 4210 | 3100 | 3400 | 0.81 | 0.91 | 0.81 | 0.91 | No | 0 | 4.68 |
| Inventive Example 6 | 4210 | 3200 | 3500 | 0.83 | 0.91 | 0.83 | 0.91 | No | 0 | 4.66 |
| Inventive Example 7 | 4210 | 3300 | 3600 | 0.86 | 0.92 | 0.86 | 0.92 | No | 0 | 4.68 |
| Inventive Example 8 | 4210 | 3400 | 3700 | 0.88 | 0.92 | 0.88 | 0.92 | No | 0 | 4.68 |
| *Comparative Example 3 | 4210 | 3500 | 3800 | 0.90 | 0.92 | 0.90 | 0.92 | No | 0 | 2.19 |
| *Comparative Example 4 | 4210 | 3600 | 3900 | 0.93 | 0.92 | 0.93 | 0.92 | No | 0 | 2.43 |
| *Comparative Example 5 | 4210 | 3700 | 4000 | 0.95 | 0.93 | 0.95 | 0.93 | Short-circuit | 83% | 0.92 |
| *Comparative Example 6 | 4210 | 3800 | 4100 | 0.97 | 0.93 | 0.97 | 0.93 | Short-circuit | 100% | Flashover |
| *Comparative Example 7 | 4210 | 3900 | 4200 | 1.00 | 0.93 | 1.00 | 0.93 | Short-circuit | 100% | Flashover |

*Departing from the scope of the present invention

Referring to Table 1, L indicates the length of the ceramic body 10, C indicates the length (C1+C2) of the overlapped portions in which the internal electrodes 31 and 32 and the floating electrode 41 are overlapped with each other, and A indicates the length of the floating electrode 41. All ceramic bodies had the length L of 4,210 µm.

The ratio (A/L) of the length of the floating electrode 41 to the length of the ceramic body 10 was changed from 0.67 to 1.00, and the ratio (C/A) of the length (C=C1+C2) of the overlapped portions between the first and second internal electrodes 31 and 32 and the floating electrode 41 to the length A of the floating electrode 41 was changed from 0.89 to 0.93.

In Comparative Examples 1 and 2, the ratios (A/L) of the length A of the floating electrode 41 to the length L of the ceramic body 10 were 0.67 and 0.69, respectively, and the ratios (C/A) of the length C of the overlapped portions to the length A of the floating electrode 41 were 0.89 and 0.90, respectively. Comparative Examples 1 and 2 correspond to cases in which the length A of the floating electrode 41 was short, such that a portion contributing to forming capacitance was small.

In Comparative Examples 1 and 2, an alignment defect was generated. Since the length A of the floating electrode 41 was short, movement of the floating electrode 41 easily occurred during the pressing and cutting of the dielectric green sheet.

In Comparative Examples 1 and 2, withstand voltages were low as 2.10 kV and 3.14 kV, respectively. Since distances between the floating electrode 41 and the first and second external electrodes 21 and 22 were excessively narrowed due to the alignment defect, dielectric breakdown was generated at a low voltage.

In Inventive Examples 1 to 8, the ratios (A/L) of the length A of the floating electrode 41 to the length L of the ceramic body 10 were 0.71 to 0.88, and the ratios (C/A) of the length (C=C1+C2) of the overlapped portions C1 and C2 to the length A of the floating electrode 41 were 0.90 to 0.92.

In Inventive Examples 1 to 8, the internal defects were not found, and the withstand voltage values were 4.67 to 4.68 kV, which were reasonable results.

In Comparative Examples 3 and 4, the ratios (A/L) of the length A of the floating electrode 41 to the length L of the ceramic body 10 were 0.90 and 0.93, respectively, and the ratios (C/A) of the length (C=C1+C2) of the overlapped portions C1 and C2 to the length A of the floating electrode 41 were 0.92.

In Comparative Examples 3 and 4, the internal defects were not found, but the withstand voltage values were low as 2.19 kV and 2.43 kV, respectively. Since the ratio (A/L) of the length A of the floating electrode 41 to the length L of the ceramic body 10 was large, that is, the length A of the floating electrode 41 was long, distances between distal ends of the floating electrode 41 and the first and second external electrodes 20 and 21 were short, such that dielectric breakdown was generated at a low voltage.

In Comparative Examples 5 to 7, the ratios (A/L) of the length A of the floating electrode 41 to the length L of the ceramic body 10 were 0.95 to 1.00, and the ratios (C/A) of the length C of the overlapped portions to the length A of the floating electrode 41 were 0.93.

In Comparative Example 5, a generation rate of short-circuit was 83%, and a product in which the short-circuit was not generated had a withstand voltage value of 0.92V. In Comparative Examples 6 and 7, a generation rate of short-circuit was 100%. It could be appreciated that since the length L of the ceramic body 10 was almost the same as the length A of the floating electrode 41, the short-circuit was generated between the first and second external electrodes 21 and 22 and the floating electrode 41 due to an error in a manufacturing process. Therefore, a withstand voltage value may not be measurable.

As described above with reference to Table 1, it could be appreciated that Inventive Examples 1 to 8 that fall within the scope of the present invention show excellent withstand voltage characteristics.

Hereinafter, a description will be described in view of areas of the first and second internal electrodes 31 and 32 and the floating electrode 41.

According to the present embodiment, in light of the fact that the first and second internal electrodes 31 and 32 and the floating electrode 41 have a rectangular shape and the same width, a ratio of areas between the first and second internal electrodes 31 and 32 and the floating electrode 41 is in proportion to the lengths of the first and second internal electrodes 31 and 32 and the floating electrode 41.

In other words, the ratio of the areas between the first and second internal electrodes 31 and 32 and the floating electrode 41 according to the present embodiment is the same as the ratio of the lengths therebetween.

Therefore, details described above with respect to the ratio of the lengths between the first and second internal electrodes 31 and 32 and the floating electrode 41 may also be similarly applied to the areas therebetween.

More specifically, in Inventive Examples 1 to 8, a ratio (Q/P) of an area (Q) of the floating electrode 41 to an area (P) of a region formed by the first and second internal electrodes 31 and 32 and the floating electrode 41 was 0.71 to 0.88, and a ratio (R/Q) of an area (R) of the overlapped portions C to the area (Q) of the floating electrode 41 was 0.9 to 0.92. In Inventive Examples 1 to 8, the internal defects were not found, and the withstand voltage values were 4.67 to 4.68 kV, which were reasonable results.

Details for Comparative Examples and Inventive Examples are the same as details described above.

As set forth above, according to embodiments of the present invention, a high capacitance and high voltage multilayer ceramic electronic component can be realized by using a floating electrode therein.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component comprising:
   a ceramic body;
   a first layer including conductive patterns spaced apart from each other by a gap; and
   a second layer disposed, with regard to the first layer, such that a ceramic layer is interposed therebetween, and including a floating pattern having at least one overlapped portion overlapped with the conductive patterns,
   wherein the sum of the number of the first and second layers is 100 or more,
   the ceramic body has first and second external electrodes formed on outer surfaces thereof, and
   a ratio of a length of the floating pattern to a length of the ceramic body is 0.7 to 0.9, and a ratio of a length of the overlapped portion to the length of the floating pattern is 0.5 to 0.95, in a cross section taken in a length direction and in a stacking direction.

2. The multilayer ceramic electronic component of claim 1, wherein a ratio of an area of the floating pattern to an area of a region formed by the conductive patterns and the floating pattern is 0.7 to 0.9, and a ratio of an area of the overlapped portion to the area of the floating pattern is 0.5 to 0.95, when viewed in the stacking direction of the first and second layers.

3. The multilayer ceramic electronic component of claim 1, wherein the conductive patterns include a first conductive pattern connected to the first external electrode and a second conductive pattern connected to the second external electrode.

4. The multilayer ceramic electronic component of claim 3, wherein the first layer further includes at least one first floating pattern disposed between the first and second conductive patterns,
the floating pattern includes a plurality of second floating patterns having portions overlapped with the first floating pattern, and
the length of the floating pattern is the sum of lengths of the plurality of second floating patterns, and the length of the overlapped portion is the sum of lengths of the overlapped portions of the second floating patterns overlapped with the conductive patterns.

5. The multilayer ceramic electronic component of claim 4, wherein a ratio of the sum of areas of the second floating patterns to an area of a region formed by the conductive patterns and the floating pattern is 0.7 to 0.9, and a ratio of the sum of areas of the overlapped portions of the second floating patterns to the sum of the areas of the second floating patterns is 0.5 to 0.95, when viewed in the stacking direction of the first and second layers.

6. The multilayer ceramic electronic component of claim 1, wherein the floating pattern is overlapped with each of two adjacent conductive patterns spaced apart from each other by the gap of the first layer.

7. The multilayer ceramic electronic component of claim 1, wherein the conductive patterns and the floating pattern have a rectangular shape, when viewed in the stacking direction of the first and second layers.

8. The multilayer ceramic electronic component of claim 1, wherein the conductive patterns have the same width as that of the floating pattern.

9. The multilayer ceramic electronic component of claim 1, wherein the ceramic layer has a thickness of 10 μm or greater.

10. The multilayer ceramic electronic component of claim 1, wherein the cross section passes through a central portion of the ceramic body.

11. A multilayer ceramic electronic component, comprising:
a ceramic body;
a first layer including conductive patterns spaced apart from each other by a gap; and
a second layer disposed, with regard to the first layer, such that a ceramic layer is interposed therebetween, and including a floating pattern having an overlapped portion overlapped with the conductive patterns,
wherein the sum of the number of the first and second layers is 100 or more, and
a ratio of an area of the floating pattern to an area of a region formed by the conductive patterns and the floating pattern is 0.7 to 0.9, and a ratio of an area of the overlapped portion to the area of the floating pattern is 0.5 to 0.95, when viewed in a stacking direction of the first and second layers.

12. The multilayer ceramic electronic component of claim 11, wherein the conductive patterns include a first conductive pattern connected to the first external electrode and a second conductive pattern connected to the second external electrode.

13. The multilayer ceramic electronic component of claim 12, wherein the first layer further includes at least one first floating pattern disposed between the first and second conductive patterns,
the floating pattern includes a plurality of second floating patterns having portions overlapped with the first floating pattern, and
the area of the floating pattern is the sum of areas of the plurality of second floating patterns, and the area of the overlapped portion is the sum of areas of the overlapped portions of the second floating patterns overlapped with the conductive patterns.

14. The multilayer ceramic electronic component of claim 11, wherein the floating pattern is overlapped with each of two adjacent conductive patterns spaced apart from each other by the gap of the first layer.

15. The multilayer ceramic electronic component of claim 11, wherein the conductive patterns and the floating pattern have a rectangular shape, when viewed in the stacking direction of the first and second layers.

16. The multilayer ceramic electronic component of claim 11, wherein the conductive patterns have the same width as that of the floating pattern.

17. The multilayer ceramic electronic component of claim 11, wherein the ceramic layer has a thickness of 10 μm or greater.

18. A multilayer ceramic electronic component comprising:
a ceramic body;
a first layer including first and second conductive patterns connected to first and second external electrodes, respectively, and a first floating pattern disposed between the first and second conductive patterns, while having gaps between the first floating pattern and the first and second conductive patterns; and
a second layer disposed, with regard to the first layer, such that a ceramic layer is interposed therebetween, and including a plurality of second floating patterns having portions overlapped with at least one of the first and second conductive patterns and the first floating pattern,
wherein the sum of the number of the first and second layers is 100 or more,
the ceramic body has first and second external electrodes formed on outer surfaces thereof, and
a ratio of the sum of lengths of the second floating patterns to a length of the ceramic body is 0.7 to 0.9, and a ratio of the sum of lengths of the overlapped portions to the sum of the lengths of the second floating patterns is 0.5 to 0.95, in a cross section taken in a length direction in which the first and second external electrodes are connected to and extended from the ceramic body and a stacking direction of the first and second layers.

19. The multilayer ceramic electronic component of claim 18, wherein a ratio of the sum of areas of the second floating patterns to an area of a region formed by the conductive patterns and the floating patterns is 0.7 to 0.9, and a ratio of the sum of areas of the overlapped portions of the second floating patterns to the sum of the areas of the second floating patterns is 0.5 to 0.95, when viewed in the stacking direction of the first and second layers.

20. The multilayer ceramic electronic component of claim 18, wherein the second floating patterns are overlapped with each of two adjacent conductive patterns spaced apart from each other by the gaps of the first layer.

21. The multilayer ceramic electronic component of claim 18, wherein the number of the second floating patterns is the same as that of the gaps.

22. The multilayer ceramic electronic component of claim 18, wherein the first and second conductive patterns and the first and second floating patterns have a rectangular shape, when viewed in the stacking direction of the first and second layers.

23. The multilayer ceramic electronic component of claim 18, wherein the first and second conductive patterns and the first and second floating patterns have the same width.

24. The multilayer ceramic electronic component of claim 18, wherein the cross section passes through a central portion of the ceramic body.

25. The multilayer ceramic electronic component of claim 18, wherein the ceramic layer has a thickness of 10 μm or greater.

* * * * *